Dec. 23, 1924.
J. W. BISHOP ET AL
1,520,107
BOWLING PIN
Filed June 5, 1922
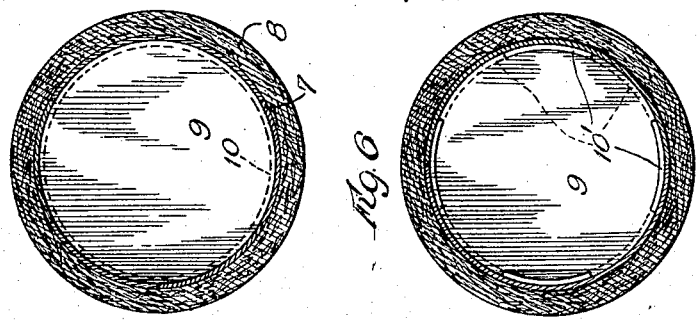
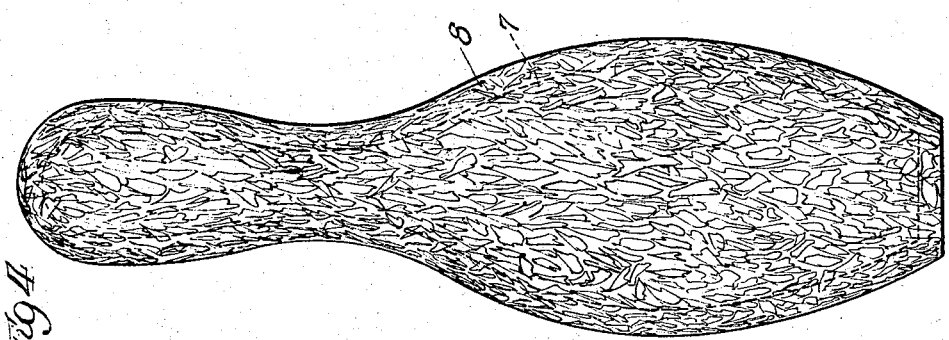
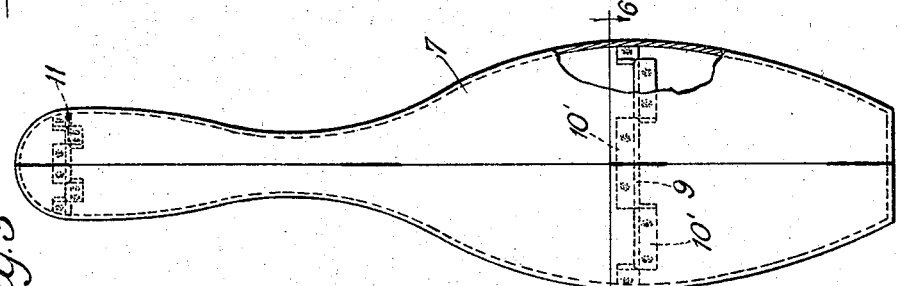
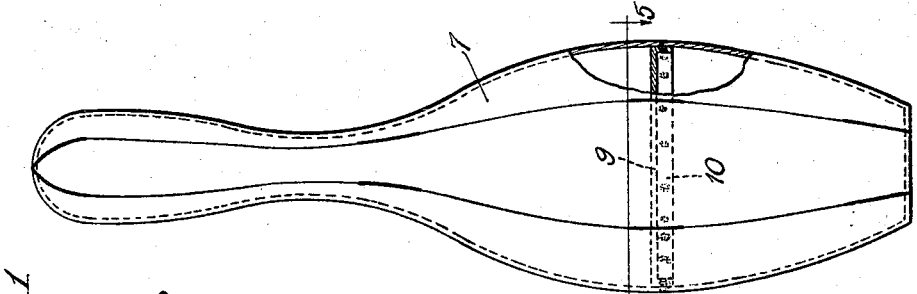
Inventors
Joseph W. Bishop and
By: Gene O. Matteson
Wm. O. Belt Atty.

Patented Dec. 23, 1924.

1,520,107

UNITED STATES PATENT OFFICE.

JOSEPH W. BISHOP AND JESSE O. MATTESON, OF MUSKEGON, MICHIGAN, ASSIGNORS TO THE BRUNSWICK-BALKE-COLLENDER COMPANY, OF CHICAGO, ILLINOIS, A CORPORATION OF DELAWARE.

BOWLING PIN.

Application filed June 5, 1922. Serial No. 565,965.

*To all whom it may concern:*

Be it known that we, JOSEPH W. BISHOP and JESSE O. MATTESON, citizens of the United States, residing at Muskegon, in the county of Muskegon and State of Michigan, have invented certain new and useful Improvements in Bowling Pins, of which the following is a specification.

This invention relates to bowling pins and it has for its object to provide a substantial and durable pin having a hollow metal core and a composition covering enclosing the core which can be economically made and used and which will give greater life and more satisfaction to bowling alley proprietors and to players than good wood pins.

In the accompanying drawings illustrating a selected embodiment of the invention—

Fig. 1 is an elevation of a core made up of a plurality of members and shown partly in section;

Fig. 2 is a detail sectional view showing another arrangement of the brace illustrated in Fig. 1;

Fig. 3 is an elevation showing a core made up of two members with a brace of different form than that shown in Figs. 1 and 2;

Fig. 4 is an elevation of a complete pin;

Figs. 5 and 6 are sectional views on the lines 5—5 and 6—6 of Figs. 1 and 3, respectively.

Referring to the drawings the hollow core 7 may be cast but it is preferably stamped or pressed out of sheet metal and formed in two or more members which are arranged together with their edges abutting and secured by welding or any other suitable means. The core is made in the general shape of a pin to receive the composition covering 8 which is applied to form a pin of regulation size, shape and weight. We may use any suitable composition for the purpose but we prefer to use a hard rubber compound having small pieces of wood in the form of little sticks or splinters thoroughly incorporated therewith, the said composition being vulcanized on and secured to the hollow metal core thereby or otherwise as more fully set forth in our companion application Serial No. 565,964 filed concurrently herewith.

We prefer to employ a transverse brace 9 at or about midway between the top and bottom of the belly of the pin and in the drawings we have shown a brace having a peripheral flange 10 which is made to fit snugly against the inner surface of the hollow core and is spot welded at 11 or otherwise rigidly secured to the core. In Fig. 1 the flange is shown continuous and extending downward on the brace; in Fig. 2 the continuous flange is shown extending upward on the brace; in Fig. 3 the flange is divided into a plurality of sections 10', 10', which are bent alternately in opposite directions to project below and above the brace. We may also provide additional braces within the core as found desirable, and in Fig. 3 we have shown a brace 12 in the head of the pin. A pin embodying our present invention will be strong and substantial, and it will effectually withstand and resist those heavy blows which are caused by the impact of the ball against the belly of the pin.

We are aware that changes in the construction and arrangement of parts and in the composition of the covering may be made without departing from the spirit or sacrificing the advantages of the invention and we reserve the right to make all such changes as fairly fall within the scope of the following claims.

We claim:

1. A bowling pin having a hollow core, a brace comprising a plate arranged within said core and having a peripheral flange secured to the core, and a composition covering enclosing the core.

2. A bowling pin having a hollow core, a brace comprising a plate arranged within said core and having a peripheral flange, said flange being welded to the core to secure the brace rigidly therein, and a composition covering enclosing the core.

3. A bowling pin comprising a hollow metal core, a transverse brace secured within the core and having a peripheral flange consisting of sections alternately bent upward and downward from the brace and secured to the core, and a composition covering enclosing the core.

4. A bowling pin having a hollow core, a brace comprising a plate arranged transversely within the core at the belly of the pin and having a flange bent substantially at a right angle to the plate at the periphery thereof and secured to the core, and a composition covering enclosing the core.

5. A bowling pin comprising a hollow metal core, a transverse brace arranged in the head of the core and comprising a plate having a peripheral flange secured to the core, and a composition covering enclosing the core.

JOSEPH W. BISHOP.
JESSE O. MATTESON.